US010300455B2

(12) United States Patent
Nicolas et al.

(10) Patent No.: US 10,300,455 B2
(45) Date of Patent: May 28, 2019

(54) ZEOLITE NANOCRYSTAL AGGREGATES

(71) Applicant: Arkema France, Colombes (FR)

(72) Inventors: Serge Nicolas, Lons (FR); Guillaume Ortiz, Pau (FR); Ludivine Bouvier, Orthez (FR); Cecile Lutz, Gan (FR)

(73) Assignee: Arkema France, Colombes (FR)

( * ) Notice: Subject to any disclaimer, the term of this patent is extended or adjusted under 35 U.S.C. 154(b) by 33 days.

(21) Appl. No.: 15/504,241

(22) PCT Filed: Sep. 10, 2015

(86) PCT No.: PCT/FR2015/052412
§ 371 (c)(1),
(2) Date: Feb. 15, 2017

(87) PCT Pub. No.: WO2016/038307
PCT Pub. Date: Mar. 17, 2016

(65) Prior Publication Data
US 2017/0274350 A1    Sep. 28, 2017

(30) Foreign Application Priority Data

Sep. 12, 2014   (FR) .................................... 14 58592

(51) Int. Cl.
*C01B 39/20*     (2006.01)
*B01J 20/18*     (2006.01)
(Continued)

(52) U.S. Cl.
CPC ............ *B01J 20/183* (2013.01); *B01D 53/02* (2013.01); *B01J 20/18* (2013.01); *C01B 39/20* (2013.01);
(Continued)

(58) Field of Classification Search
CPC ....... C01B 39/20; C01B 39/205; C01B 39/22; C01B 29/24; B01L 20/18; B01L 29/08; B01L 29/082
See application file for complete search history.

(56) References Cited

U.S. PATENT DOCUMENTS 3,947,482 A    3/1976 Albers
5,928,623 A    7/1999 Plee
(Continued)

FOREIGN PATENT DOCUMENTS

CN    103214003    7/2013
EP    0170299      1/1985
(Continued)

OTHER PUBLICATIONS

Jin, J., et al., "Facile Synthesis of Mesoporous Zeolite Y with Improved Catalytic Performance for Heavy Oil Fluid Catalytic Cracking," Feb. 3, 2014, pp. 3406-3411, vol. 53, Industrial & Engineering Chemistry Research.
(Continued)

*Primary Examiner* — David M Brunsman
(74) *Attorney, Agent, or Firm* — RatnerPrestia (57) ABSTRACT

The present invention relates to a zeolite material in the form of FAU zeolite nanocrystal aggregates, to the method for preparing said material, to the zeolite agglomerates prepared from said material with a binder, and to the uses of said material and agglomerate as adsorbents for gas-phase or liquid-phase separation operations, and particularly in methods for separating gas or liquid flows.

17 Claims, 2 Drawing Sheets

(51) Int. Cl.
*C01B 39/22* (2006.01)
*C01B 39/24* (2006.01)
*B01D 53/02* (2006.01)
*B01J 29/08* (2006.01)

(52) U.S. Cl.
CPC ............ *C01B 39/205* (2013.01); *C01B 39/22* (2013.01); *C01B 39/24* (2013.01); *B01D 2253/1085* (2013.01); *B01J 29/08* (2013.01); *B01J 29/082* (2013.01)

(56) References Cited

U.S. PATENT DOCUMENTS

| | | | |
|---|---|---|---|
| 6,743,745 | B2 | 6/2004 | Jaussaud |
| 2012/0100066 | A1 | 4/2012 | Moscoso |
| 2012/0227584 | A1 | 9/2012 | Wang |
| 2015/0306565 | A1 | 10/2015 | Bouvier |
| 2016/0137517 | A1 | 5/2016 | Nicolas |
| 2016/0176720 | A1* | 6/2016 | Nicolas .................. C01B 39/24 428/402 |

FOREIGN PATENT DOCUMENTS

| | | |
|---|---|---|
| EP | 0818418 | 1/1998 |
| JP | 2008230886 | 10/2008 |
| JP | 2009155187 | 7/2009 |
| WO | 2014090771 | 6/2014 |
| WO | 2015019013 | 2/2015 |
| WO | 2015028740 | 3/2015 |

OTHER PUBLICATIONS

Liu, B., et al., "Synthesis and Structural Properties of Hierarchically Structured Aluminosilicates with Zeolite Y (FAU) Frameworks," Jun. 13, 2013, pp. 15075-15084, vol. 3, RSC Advances.

International Search Report and Written Opinion for International Application No. PCT/FR2015/052412, dated Dec. 2, 2015—12 Pages.

Vuong-Gia Thanh, PhD dissertation "Synthesis and Characterization of Nanozeolites", Dec. 2006, University of Laval, Quebec—pp. 1-77.

T. Tago and T. Masuda, Zeolite Nanocrystals—Synthesis and Applications, Chapter 8, "Nanocrystals", published by Intech, (2010)—18 Pages.

\* cited by examiner

ZEOLITE NANOCRYSTAL AGGREGATES

CROSS-REFERENCE TO RELATED APPLICATIONS

This is the national phase of International Application No. PCT/FR2015/052412, filed 10 Sep. 2015, which claims priority to French Application No. 1458592, filed 12 Sep. 2014. The disclosure of each of these applications is incorporated herein by reference in its entirety for all purposes.

FIELD OF THE INVENTION

The present invention relates to the field of zeolites, particularly zeolites in the form of very small crystals, more particularly zeolites in the form of nanometric crystals. The present invention also relates to the process for preparing such zeolites in the form of nanometric crystals, and also to their use for preparing zeolite adsorbents by agglomeration with a binder.

BACKGROUND OF THE INVENTION

Recourse to zeolite crystals of very small sizes, especially nanometric, is of great interest when excellent transfer properties are desired. There are at the present time mainly three synthetic methods for obtaining small-sized crystals, as taught in many publications (see for example T. Tago and T. Masuda, *Zeolite Nanocrystals—Synthesis and Applications*, chapter 8, *"Nanocrystals"*, published by INTECH, (2010), 326 pages, or Vuong-Gia Thanh, PhD dissertation *"Synthesis and characterization of nanozeolites"*, December 2006, University of Laval, Quebec).

These three synthetic methods may be summarized as follows:
1) synthesis in very dilutive medium and at low temperature, most of the time below room temperature; these techniques have the drawback of being long and sparingly economical in industrial terms;
2) synthesis in confined spaces such as the pores of carbon matrices, microemulsion droplets, polymer hydrogels and the like; and
3) synthesis with growth inhibitors, optionally in the presence of an organic solvent, which are introduced into the reaction mixture after the maturation phase and which are directed toward limiting the crystal growth; these processes are sparingly economical on account of the relatively long synthesis times; T Tago et al. (ibid.) propose, for example, nonionic surfactants such as polyoxyethylene-based ethers or ionic surfactants such as cetyltrimethylammonium bromide (CTAB) or sodium bis(2-ethylhexyl)sulfosuccinate (AOT), which lead to relatively long synthesis times, of the order of several days.

Patent application JP2009155187 discloses the synthesis of a colloidal zeolite of faujasite type (FAU) with an $SiO_2/Al_2O_3$ ratio of between 2 and 6, having a bipopulation of particles with a first mean diameter of between 20 nm and 200 nm and a second mean diameter of between 20 nm and 800 nm, the ratio of these mean diameters ranging from 1 to 5 and the network constant (UD) being between 24.60 Angströms and 24.90 Angströms. The purpose sought in said application is to obtain very sparingly agglomerated crystals.

Patent JP2008230886 presents the synthesis of relatively uniform small particles by seeding with a transparent solution of nuclei, i.e. of very small nuclei, obtained after a very long maturation time, i.e. more than 100 hours. This process thus appears for this reason to be uneconomical and industrially unenvisageable.

The synthesis, filtration and handling of nanometric solids of this type are, however, difficult, not only on account of the small sizes of said solids, but also on account of their low density.

Attempts to make the handling of such nanometric solids less difficult are illustrated, for example, by US2012100066 which teaches a means for recovering zeolite nanocrystals by centrifugation followed by a phase of placing in contact with a solution that allows agglomeration of the crystals with each other.

Certain authors teach that such small zeolite objects may be aggregated in the form of secondary particles which are easier to handle and which will conserve satisfactory transfer properties. Thus, for example, patent application US 20120227584 proposes FAU zeolite nanocrystal aggregates with a mean diameter of greater than or equal to 0.8 µm, the mean diameter of the nanocrystals being less than or equal to 0.3 µm, and in which at least 80% of the primary particles (nanocrystals) are aggregated. In this case also, the synthesis, performed in dilute medium, is long, uneconomical and consequently industrially unenvisageable.

In addition, the zeolite objects must have substantial or even maximum crystallinity, in terms of the Dubinin-Raduskevitch volume and the purity of the crystalline phase obtained by x-ray diffraction (XRD).

There thus remains at the present time a need for an economical, readily industrializable process for synthesizing zeolite nanocrystal aggregates having substantial or even maximum crystallinity.

SUMMARY OF THE INVENTION

The inventors have now discovered that it is possible to prepare such zeolite nanocrystals, said nanocrystals being obtained in the form of aggregates and thus easy to handle, the preparation being simple, rapid and economical and thus readily adaptable to the industrial scale.

Thus, and according to a first subject, the present invention relates to a zeolite material in the form of FAU zeolite nanocrystal aggregates having at least the following characteristics:
  Si/Al atomic ratio of between 1 and 1.4, limits inclusive,
  external surface area of between 20 $m^2 \cdot g^{-1}$ and 80 $m^2 \cdot g^{-1}$, preferably between 30 $m^2 \cdot g^{-1}$ and 80 $m^2 \cdot g^{-1}$, more preferably between 40 and 60 $m^2 \cdot g^{-1}$,
  number-mean diameter of the nanocrystals of between 50 nm and 500 nm, preferably between 50 nm and 400 nm, more preferably between 100 nm and 400 nm, more preferentially between 100 nm and 300 nm, limits inclusive, and
  number-mean aggregate size of between 0.2 µm and 10 µm, preferably between 0.3 µm and 10 µm, more preferably between 0.5 µm and 8 µm.

DETAILED DESCRIPTION OF CERTAIN EMBODIMENTS OF THE INVENTION

According to a preferred embodiment, the zeolite nanocrystals according to the present invention are zeolite nanocrystals of FAU type, and especially of zeolite(s) chosen from zeolites X, MSX and LSX. The term "zeolite MSX" (medium silica X) means a zeolite of FAU type with an Si/Al atomic ratio of between about 1.05 and about 1.15, limits inclusive. The term "zeolite LSX" (low silica X) means a zeolite of FAU type with an Si/Al atomic ratio equal to about 1. Zeolites of FAU X type are most particularly preferred.

The characteristics cited above give the zeolite materials in the form of aggregated zeolite nanocrystals according to the present invention improved and entirely surprising and advantageous properties, when compared with the zeolite materials known from the prior art. In particular, these zeolite nanocrystal aggregates have an entirely advantageous inter-crystalline mesoporosity to further improve the transfer properties in applications in which such properties are desired.

The term "inter-crystalline mesopores" means cavities with a diameter of greater than about 2 nm which are observed between the filled crystals that are aggregated/agglomerated together. The term "filled crystals" means crystals with no apparent mesoporosity, i.e. mesoporosity which is invisible under a transmission electron microscope, according to the analytical technique outlined later in the description.

The size of the zeolite nanocrystal aggregates according to the present invention is expressed by their number-mean diameter by observation using a scanning electron microscope (SEM), as indicated later.

The size of the zeolite nanocrystals forming the aggregates according to the present invention is also expressed by their number-mean diameter by observation using a scanning electron microscope (SEM), as indicated later. The invention also has the advantage of making it possible to adjust and control both the size of the nanocrystals and the size of the aggregates, especially as a function of the synthesis conditions outlined below, and in particular as a function of the nucleating agent and the control agent.

In the present invention, the external surface area is measured from the nitrogen adsorption isotherm by the t-plot method described later, by applying the Harkins-Jura equation.

The zeolite nanocrystal aggregates according to the invention are solids comprising a micropore network linked to an inter-crystalline mesopore network, and thus make it possible to reconcile the properties of accessibility to the active sites of the zeolites and those of crystallinity and microporosity of said zeolites. Thus, the zeolite nanocrystals of the present invention have unexpected properties and offer new perspectives as regards their fields of industrial application.

In addition, the zeolite nanocrystal aggregates of the present invention may be subjected to one or more cation exchanges (for example with alkali metal or alkaline-earth metal salt(s)), according to ion-exchange techniques that are well known to those skilled in the art and commonly performed on zeolite materials. The zeolite nanocrystal aggregates of the present invention in which the exchangeable sites of the zeolites are occupied by ions chosen from hydronium, lithium, sodium, potassium, calcium, barium, and the like, more preferably from lithium, sodium, potassium, calcium and barium ions, are thus preferred.

According to a second aspect, the present invention relates to the process for preparing the zeolite nanocrystal aggregates as have just been described. The process of the invention especially has the advantages of being easy to perform and readily transposable to the industrial scale, this being possible especially on account of the high synthetic material yields and the robustness and rapidity of the process.

More particularly, the process for synthesizing said zeolite nanocrystal aggregates according to the invention uses both a control agent and a step of seeding with a nucleating agent, such as gel, crystal, mineral particle, and the like, as outlined later in the description of the present invention.

The term "control agent" means a chemical compound for controlling the crystal growth of the zeolite crystals, whilst simultaneously making it possible to obtain optimum crystallinity. The control agents that may be used in the process of the present invention are advantageously chosen from surfactants, structuring agents, crystal growth inhibitors, dispersants, and other chemical compounds commonly used in the synthesis of zeolite materials.

According to a preferred aspect, the control agents that may be used in the process of the present invention comprise at least one silicon atom, and more preferably are chosen from organo-silyl compounds, and better still from organosilanes. According to another preferred aspect, the control agents are compounds comprising at least one nitrogen atom, and more preferably at least one amine function, and more preferably at least one ammonium function. Among the entirely preferred control agents, mention may be made of organosilanes functionalized with at least one amine and/or ammonium function.

More precisely, the process for preparing the zeolite nanocrystal aggregates according to the invention comprises at least the following steps:
a) preparing a "growth" gel, by mixing a source of silica with a source of alumina, at a temperature of between 0° C. and 60° C.,
b) adding to the growth gel from step a) a nucleating agent, at a temperature between 0° C. and 60° C.,
c) adding to the reaction medium at least one control agent,
d) crystallization reaction by increasing the temperature,
e) filtering and washing the zeolite crystals obtained, and
f) drying and calcination.

It should be understood that step c) of adding control agent(s) may be performed at the same time as steps a) and/or b) or alternatively before and/or after steps a) and/or b). In any event, it is preferred for the control agent to be present in the reaction medium before the crystallization step d). However, it is preferred to add the control agent after step b). In addition, a lag time (resting time, with or without stirring) may be envisaged between steps a), b), c) and d).

According to a preferred aspect, the growth gel comprises a homogeneous mixture of a source of silica (for example sodium silicate), a source of alumina (for example alumina trihydrate), a strong mineral base, for instance sodium hydroxide, potassium hydroxide or calcium hydroxide to mention but the main ones and the ones most commonly used, and water.

The process of the present invention is characterized by the use of the technique of seeding (step b)) with at least one nucleating agent that is well known to those skilled in the art, chosen, for example, from a nucleating gel, a crystal, for example a zeolite crystal, a mineral particle of any nature, for example a clay, for instance, and in a nonlimiting manner, kaolin, meta-kaolin, or the like, and the like, and also mixtures thereof.

According to a preferred aspect, the nucleating agent is a nucleating gel, and, more preferably, said nucleating gel comprises a homogeneous mixture of a source of silica (for example sodium silicate), a source of alumina (for example alumina trihydrate), a strong mineral base, for instance sodium hydroxide, potassium hydroxide or calcium hydroxide to mention but the main ones and the ones most commonly used, and water.

Homogeneity of the mixture (growth gel and/or nucleating gel) may be obtained according to any process that is well known to those skilled in the art, and, for example, and in a nonlimiting manner, using a paddle stirrer, a mixer, or alternatively using a mixer of Archimedean screw type as described in patent EP0818418.

As a nonlimiting example, in a 3 liter reactor with an Archimedean screw whose rotation is set at 300 rpm, satisfactory homogeneity is obtained between a few minutes and a few tens of minutes, generally between 20 minutes and 30 minutes.

The mixture is generally prepared at temperatures of between 0° C. and 60° C., preferably between 10° C. and 40° C., and for practical and economic reasons, the mixture is prepared more preferably at room temperature, for example at 25° C. The homogenization period is then generally less than 2 hours.

As indicated previously, the process of the present invention is characterized especially by the addition to the growth gel thus obtained of a nucleating agent, and preferably of a nucleating gel according to the concept defined, for example, in U.S. Pat. No. 3,947,482. The amount of nucleating agent added may vary within wide proportions, and the amount of nucleating gel added may generally be between 0.1% and 20%, preferably between 0.5% and 15% by weight, more preferably between 1% and 10% by weight, limits inclusive, relative to the weight of the growth gel.

When the nucleating agent is a zeolite crystal, it is preferably a zeolite crystal of the same nature as the zeolite that it is desired to synthesize. The number-mean diameter of the seed crystal (zeolite crystal) may vary within wide proportions, and is, for example, typically between 0.1 µm and 10 µm, preferably between 0.1 µm and 5 µm, more preferably between 0.1 µm and 1 µm. According to a preferred embodiment, the seed crystal (zeolite crystal) is introduced in the form of an aqueous suspension. The amount of seed crystals introduced may also vary within wide proportions and is generally typically between 0.1% and 10% by weight relative to the total weight of growth gel.

The process according to the present invention is also characterized by a step of adding to the mixture [growth gel/nucleating agent] obtained in step b) at least one control agent as defined previously.

According to a preferred embodiment, the control agent is advantageously chosen from organosilanes and more preferentially from N-phenylaminopropyltrimethoxysilane (PHAPTMS, more commonly known under the trade name "SIP"), aminopropyltrimethoxysilane (APTMS), isobutyltriethoxysilane (IBTES), octadecyltrimethoxysilane (ODTMS), [3-(trimethoxysilyl)propyl]octadecyldimethylammonium chloride, [3-(trimethoxysilyl)propyl]hexadecyldimethylammonium chloride, [3-(trimethoxysilyl)propyl]dodecyldimethylammonium chloride, [3-(trimethoxysilyl)propyl]octylammonium chloride, N-[3-(trimethoxysilyl)propyl]aniline, 3-[2-(2-aminoethylamino)ethylamino]propyltrimethoxysilane, N-[3-(trimethoxysilyl)propyl]-N'-(4-vinylbenzyl)ethylenediamine, triethoxy-3-(2-imidazolin-1-yl)propylsilane, 1-[3-(trimethoxysilyl)propyl]urea, N-[3-(trimethoxysilyl)propyl]ethylenediamine, [3-(diethylamino)propyl]trimethoxysilane, (3-glycidyloxypropyl)trimethoxysilane, 3-(trimethoxysilyl)propyl methacrylate, [2-(cyclohexenyl)ethyl]triethoxysilane, dodecyltriethoxysilane, hexadecyltrimethoxysilane, (3-aminopropyl)trimethoxysilane, (3-mercaptopropyl)trimethoxysilane and (3-chloropropyl)trimethoxysilane, and the like, and also mixtures of two or more thereof in all proportions.

Among the control agents listed above, N-phenylaminopropyltrimethoxysilane (SIP) and [3-(trimethoxysilyl)propyl]octadecyldimethylammonium chloride (TPOAC) are most particularly preferred.

Use may also be made of control agents of higher molar mass, for example silyl polymers, optionally bearing silanol functions, for instance poly(oxyethylene) ether-alkyl-trialkoxysilanes and polypropylene-oxide-diamine-alkyltrimethoxysilanes.

In addition to the above-mentioned control agents, it is possible to add, simultaneously or sequentially, one or more oligomeric or polymeric additives, for instance those chosen from PPDA (Polymer Poly-DiallyldimethylAmmonium), PVB (PolyVinyl Butyral), poly(ethylene glycol)-block-poly (propylene glycol)-block-poly(ethylene glycol), and, for example, those known commercially under the name Pluronic® P123 sold by BASF.

The amount of control agent(s) used in the process of the present invention may vary within wide proportions and is generally such that the starting control agent(s)/$Al_2O_3$ mole ratio is between 0.001 and 0.15, preferably between 0.001 and 0.12, limits inclusive.

Among the control agents of organosilane type listed above, those comprising at least one ammonium function form a subgroup of control agents that are most particularly suitable for the process of the invention.

Among the organosilanes which do not comprise any ammonium functions, examples that may be mentioned include N-[3-(trimethoxysilyl)propyl]aniline, 3-[2-(2-aminoethylamino)ethylamino]propyltrimethoxysilane, N-[3-(trimethoxysilyl)propyl]-N'-(4-vinylbenzyl)ethylenediamine, triethoxy-3-(2-imidazolin-1-yl)propylsilane, 1-[3-(trimethoxysilyl)propyl]urea, N-[3-(trimethoxysilyl)propyl]ethylenediamine, [3-(diethylamino)propyl]trimethoxysilane, (3-glycidyloxypropyl)trimethoxysilane, 3-(trimethoxysilyl) propyl methacrylate, [2-(cyclohexenyl)ethyl]triethoxysilane, dodecyltriethoxysilane, hexadecyltrimethoxysilane, (3-aminopropyl)trimethoxysilane, (3-mercaptopropyl) trimethoxysilane, (3-chloropropyl)trimethoxysilane, N-phenylaminopropyltrimethoxysilane (SIP), aminopropyltrimethoxysilane (APTMS), isobutyltriethoxysilane (IBTES), octadecyltrimethoxysilane (ODTMS), silyl polymers, and the like, and also mixtures of two or more thereof in all proportions.

Among the control agents listed above, N-phenylaminopropyltrimethoxysilane (SIP) is most particularly preferred.

In the case of the control agents which are organosilanes not comprising any ammonium functions and described above, it is preferred to use a starting control agent(s)/$Al_2O_3$ mole ratio of between 0.01 and 0.15, preferably between 0.01 and 0.12, limits inclusive.

Among the control agents which are organosilanes comprising at least one ammonium function, it is preferred to use those chosen from [3-(trimethoxysilyl)propyl]octadecyldimethylammonium chloride, [3-(trimethoxysilyl)propyl]hexadecyldimethylammonium chloride, [3-(trimethoxysilyl)propyl]dodecyldimethylammonium chloride, [3-(trimethoxysilyl)propyl]octylammonium chloride, and the like, and also mixtures of two or 1.5 more thereof in all proportions.

Among the control agents listed above, [3-(trimethoxysilyl)propyl]octadecyldimethylammonium chloride, or TPOAC, is most particularly preferred.

In the case of the organosilanes comprising at least one ammonium function, as described above, it is preferred to use a starting control agent(s)/$Al_2O_3$ mole ratio of between 0.001 and 0.015, limits inclusive.

The addition of the control agent(s) is performed with stirring, for example as indicated previously in step a), and the mixture is then subjected to a maturation step, preferentially with stirring, still at the same temperature, for example at 25° C., with stirring, for a time ranging from a few minutes to several tens of minutes, typically for one hour.

After this maturation step, the reaction mixture is engaged in the crystallization step d), still with stirring, but slower, typically between 20 rpm and 100 rpm, for example at 50 rpm, and increasing the temperature up to a value generally between 60° C. and 100° C., for example 75° C. The time required for the crystallization is generally between a few hours and several tens of hours, advantageously between 8 hours and 48 hours.

On conclusion of the crystallization step, the zeolite nanocrystals are extracted from the reaction medium by filtration, and then washed with one or more suitable aqueous and/or organic solvents, preferably aqueous solvents, and finally dried at between 50° C. and 150° C., according to the usual techniques known to those skilled in the art.

The mean size of the nanocrystals and aggregates may especially be controlled by adjusting the amount and nature of the nucleating agent (nucleating gel, or crystals, for example zeolite crystals, or the like) and/or of the control agent.

The dried nanocrystal aggregates are then subjected to calcination, this step being necessary to obtain a solid that is ready to be used in the applications known to those skilled in the art and which use zeolites. The calcination especially performed to remove the control agent may be performed according to any calcination method known to those skilled in the art. For example, and in a nonlimiting manner, the calcination of the zeolite nanocrystals comprising the control agent may be performed under a stream of an oxidizing and/or inert gas, especially with gases such as oxygen, nitrogen, air, a dry and/or decarbonated air, or an oxygen-depleted air, which is optionally dry and/or decarbonated, at one or more temperatures above 150° C., typically between 180° C. and 800° C., preferentially between 200° C. and 650° C., for a few hours, for example between 2 and 6 hours. The nature of the gases, the temperature increase ramps and the successive temperature stages and their durations will be adapted as a function of the nature of the control agent.

It would not be a departure from the context of the invention to perform one or more cation exchanges (for example with alkali metal or alkaline-earth metal salt(s)), before or after the drying and/or calcination step (step f)), according to the standard cation exchange techniques.

As indicated previously, the synthetic process of the invention is easy to perform and is performed in a relatively short time, and especially in a time reduced by a factor of at least 4 relative to the synthetic processes known in the prior art, which are very long and/or which are performed in very dilute medium, which necessitates the handling of very large volumes of liquids.

This simplicity and speed of synthesis do not, however, harm the quality or the properties of the zeolite nanocrystal aggregates thus obtained. Specifically, by means of the process of the invention, it is possible to increase the selectivity of the synthesis toward a zeolite nanocrystal aggregate structure.

Indeed, with the prior art processes, the increase in micropore volume of the zeolite and the maintained purity of the elevated phase, with typically less than 5%, preferably less than 2% of the polluting phase (zeolitic phase other than FAU zeolite), only very long mean crystallization time is obtained and at relatively low temperatures (<80° C.). These processes however never reach micropore volumes comparable to those of the invention.

Thus, compared with the other processes for preparing zeolite nanocrystal aggregates, the process of the invention is more productive and less expensive, since it is performed in only one step, of relatively short duration (generally of the order of about a day) with a small amount of control agent, and thus globally with a relatively low cost, or at the very least with a limited excess cost.

The use of these zeolite nanocrystal aggregates is particularly advantageous in industrial processes such as adsorption, ion exchange and separation, and may also be envisaged in any technical field in which zeolites are usually used; in particular, the zeolite material in the form of zeolite nanocrystal aggregates may be used as an adsorbent, in particular for gas-phase or liquid-phase separation operations, and more particularly in processes for separating gaseous or liquid streams, such as gas-phase pressure-modulated adsorption processes, gas-phase or liquid-phase temperature-modulated adsorption processes, adsorption processes in a fixed bed without regeneration, and separation processes in simulated moving beds, to mention but a few nonlimiting examples.

It is also particularly advantageous, especially for the applications mentioned above, to prepare solid zeolite materials from the zeolite nanocrystal aggregates according to the invention, by agglomeration with a binder. The agglomeration binder that may be used is well known to those skilled in the art and may be chosen from clays, organic polymers, silicas, aluminas, and the like, and also mixtures of two or more thereof. The binder that may be used in the context of the present invention may thus be chosen from conventional binders known to those skilled in the art, which may or may not be zeolitizable, and preferably chosen from clays and mixtures of clays, silicas, aluminas, colloidal silicas, alumina gels, and the like, and mixtures thereof.

The clays are preferably chosen from: kaolins, kaolinites, nacrites, dickites, halloysites, attapulgites, sepiolites, montmorillonites, bentonites, illites and metakaolins, and also mixtures of two or more thereof in all proportions.

Use may also be made of fibrous clays of sepiolite or attapulgite type, the clay(s) possibly, in general, being formulated in the form of dry-ground and selected powders, or better still of gel (i.e. delaminated clays) and dispersed, and optionally ground, such as the commercial clays Min-U-Gel®, Pansil®, Pangel®, Cimsil®, Attagel®, Actigel®, etc., which may or may not have undergone one or more chemical treatments. Such gels are described, for example, in EP170299 or U.S. Pat. No. 6,743,745.

The binder content, expressed as anhydrous percentages, is less than or equal to 30%, preferably less than or equal to 20% and advantageously less than or equal to 15%.

Thus, and according to yet another aspect, the invention relates to a zeolite agglomerate comprising at least one zeolite material in the form of FAU zeolite nanocrystal aggregates as defined previously and at least one binder as defined previously, the binder content being less than or equal to 30%, preferably less than or equal to 20% and advantageously less than or equal to 15%. It would not constitute a departure from the scope of the invention to perform on the zeolite agglomerate one or more cation exchanges, according to methods that are well known to those skilled in the art, and, for example, as described previously, especially using alkali metal or alkaline-earth metal salts.

The zeolite agglomerate defined above may be used in numerous applications and in particular those mentioned above for the zeolite material in the form of zeolite nanocrystal aggregates of the invention, inter alia in industrial processes such as adsorption, ion exchange and separation, but also in any technical field in which zeolites are usually used; in particular, the agglomerate comprising the zeolite nanocrystal aggregates may be used as an adsorbent, in particular for gas-phase or liquid-phase separation operations, and most particularly in processes for separating gaseous or liquid streams, such as gas-phase pressure-modulated adsorption processes, gas-phase or liquid-phase temperature-modulated adsorption processes, adsorption processes in a fixed bed without regeneration, and separation processes in simulated moving beds, to mention but a few nonlimiting examples.

The present invention is now illustrated by the examples that follow, which are presented without any intention to limit the various embodiments of the invention.

In the examples that follow, the physical properties of the zeolite crystals are evaluated by the methods known to those skilled in the art, the main ones of which are recalled below.

Loss on Ignition of the Zeolite Crystals

The loss on ignition is determined under an oxidizing atmosphere, by calcination of the sample in air at a temperature of 950° C.±25° C., as described in standard NF EN 196-2 (April 2006). The measured standard deviation is less than 0.1%.

Dubinin-Raduskevitch Volume:

The Dubinin-Raduskevitch volume is determined from the measurement of the adsorption isotherm of nitrogen at its liquefaction temperature. Prior to the adsorption, the zeolite-based adsorbent is degassed at between 300° C. and 450° C. for a time of between 9 hours and 16 hours, under vacuum ($P < 6.7 \times 10^{-4}$ Pa). Measurement of the adsorption isotherms is then performed on a machine of ASAP 2020 type from Micromeritics, taking at least 35 measurement points at relative pressures of ratio P/P0 between 0.002 and 1. The micropore volume is determined according to Dubinin-Raduskevitch from the isotherm obtained, by applying standard ISO 15901-3 (2007). The evaluated micropore volume according to the Dubinin-Raduskevitch equation is expressed in $cm^3$ of liquid adsorbate per gram of zeolite. The measurement uncertainty is $\pm 0.003$ $cm^3 \cdot g^{-1}$.

Crystal Size and Morphology (SEM)

Estimation of the number-mean diameter of the nanocrystals and of the zeolite nanocrystal aggregates is performed as indicated previously by observation using a scanning electron microscope.

In order to estimate the size of the zeolite nanocrystals on the samples, a set of images is taken at a magnification of at least 5000. The diameter of at least 200 crystals is then measured using dedicated software, for example the Smile View software published by LoGraMi. The accuracy is of the order of 3%.

The morphology of the nanocrystals and of the zeolite nanocrystal aggregates is qualified from the SEM photographs taken at the magnification suited to the size of the solids observed.

Observation of the Mesopore Structure by Transmission Electron Microscopy (TEM)

The powder is dispersed in ethanol: 1 minute under ultrasonication. One drop of the solution is placed on a microscope slide-grid. The sample is left to dry in the open air. The observation is performed using a transmission electron microscope (CM 200 from FEI) at a voltage of 120 kV.

The magnifications obtained of ×175000 (cf FIG. 3 and FIG. 4) make it possible to confirm the absence of intra-crystalline mesopores.

In the present invention, the term "intra-crystalline mesopores" means cavities with a diameter greater than 2 nm located inside the crystals and observed with a transmission electron microscope. The term "inter-crystalline mesopores" means cavities with a diameter greater than 2 nm resulting from the aggregation of filled crystals (having no intra-crystalline mesoporosity).

Measurement of the External Surface Area (S ext. in $m^2 \cdot g^{-1}$) Via the T-Plot Method:

The t-plot calculation method exploits the nitrogen adsorption isotherm data Q ads=f (P/P0) and makes it possible to calculate the micropore surface area. The external surface area may be deduced therefrom by determining the difference with the BET surface area which measures the total pore surface area in $m^2 \cdot g^{-1}$ (S BET=S microp.+S ext.).

To calculate the micropore surface area (S microp.) via the t-plot method, the curve Q ads ($cm^3 \cdot g^{-1}$) is plotted as a function of t=thickness of the layer depending on the partial pressure P/P0 that would be formed on a reference nonporous solid (t function of log P/P0: Harkins-Jura equation applied (ISO standard 15901-3:2007)):

$$[13,99/(0,034-\log(P/P0))^{1/2}],$$

in which, in the interval t between 0.35 nm and 0.5 nm, a straight line may be plotted which defines an intercept point Q adsorbed, which makes it possible to calculate the micropore surface area; if the solid is not microporous, the line passes through 0.

Elemental Chemical Analysis and Analysis of the Si/Al Atomic Ratio by X-Ray Fluorescence An elemental chemical analysis of the solids (nanocrystals, nanocrystal aggregates, agglomerates) may be performed according to various analytical techniques known to those skilled in the art. Among these techniques, mention may be made of the technique of chemical analysis by x-ray fluorescence as described in standard NF EN ISO 12677: 2011 on a wavelength-dispersive spectrometer (WDXRF), for example the Tiger S8 machine from the company Bruker.

X-ray fluorescence is a non-destructive spectral technique which exploits the photoluminescence of atoms in the x-ray range, to establish the elemental composition of a sample. Excitation of the atoms, generally with an x-ray beam or by electron bombardment, generates specific radiations after returning to the ground state of the atom. The x-ray fluorescence spectrum has the advantage of depending very little on the chemical combination of the element, which offers a precise determination, both quantitatively and qualitatively. A measurement uncertainty of less than 0.4% by weight is conventionally obtained after calibration for each oxide.

These elemental chemical analyses make it possible to inspect the Si/Al atomic ratio of the zeolite: the measurement uncertainty of the Si/Al atomic ratio is ±5%.

Qualitative and Quantitative Analyses by X-Ray Diffraction

This analysis makes it possible to identify the crystalline phases present in the solid analyzed since each of the zeolite structures has a unique diffractogram defined by the positioning of the diffraction peaks and by their relative intensities.

The zeolite nanocrystal aggregates are spread and leveled out on a sample holder by simple mechanical compression. The conditions under which the diffractogram is acquired on the Brüuker D5000 machine are as follows:

Cu tube used at 40 kV-30 mA;

slit size (divergent, scattering and analysis)=0.6 mm;

filter: Ni;
sample device rotating at: 15 rpm;
measuring range: 3°<2θ<50°;
increment: 0.02°;
counting time per increment: 2 seconds.

Interpretation of the diffractogram obtained is performed with the EVA software with identification of the phases using the ICDD PDF-2 release 2011 base, which makes it possible to reveal a perfectly crystalline phase.

The amount of the zeolite X fractions is measured by x-ray diffraction analysis. This analysis is performed on a Bruker brand machine, and the amount of the zeolite X fractions is then evaluated using the TOPAS software from the company Brüker.

Example 1 (Comparative)

Synthesis with Nucleating Gel and Growth Gel, without Control Agent a) Preparation of the Growth Gel in a Reactor Stirred with an Archimedean Screw A growth gel is prepared in a 3 liter stainless-steel reactor equipped with a heating jacket, a temperature probe and a stirrer, by mixing an aluminate solution containing 119 g of sodium hydroxide (NaOH), 128 g of alumina trihydrate ($Al_2O_3.3H_2O$, containing 65.2% by weight of $Al_2O_3$) and 195.5 g of water at 25° C. over 25 minutes, with a stirring speed of 300 rpm, with a silicate solution containing 565.3 g of sodium silicate, 55.3 g of NaOH and 1997.5 g of water at 25° C.

The stoichiometry of the growth gel is as follows: 3.48 $Na_2O/Al_2O_3$/3.07 $SiO_2$/180 $H_2O$. Homogenization of the growth gel is performed with stirring at 300 rpm for 25 minutes at 25° C.

b) Addition of the Nucleating Gel 61.2 g of nucleating gel (i.e. 2% by weight) of composition 12 $Na_2O/Al_2O_3$/10 $SiO_2$/180 $H_2O$ prepared in the same manner as the growth gel, and which has matured for 1 hour at 40° C., is added to the growth gel, at 25° C. with stirring at 300 rpm. After 5 minutes of homogenization at 300 rpm, the stirring speed is reduced to 100 rpm and stirring is continued for 30 minutes.

c) Crystallization

The stirring speed is lowered to 50 rpm, and the reactor jacket is set to a nominal value of 80° C. so that the reaction medium rises in temperature to 75° C. over 80 minutes. After 22 hours at a stage of 75° C., the reaction medium is cooled by circulating cold water through the jacket to stop the crystallization.

d) Filtration/Washing

The solids are recovered on a sinter and then washed with deionized water to neutral pH.

e) Drying/Calcination

In order to characterize the product, drying is performed in an oven at 90° C. for 8 hours, and the loss on ignition of the dried product is 23% by weight.

A zeolite X with an Si/Al atomic ratio equal to 1.24 is obtained, in the form of very large aggregates.

Example 2 (Comparative)

Synthesis of Zeolite X Without Addition of Nucleating Gel, and with Addition of Growth Gel, and Addition of Control Agent: $SIP/Al_2O_3$ Ratio=0.02 a) Preparation of the Growth Gel in a Reactor Stirred with an Archimedean Screw

A growth gel is prepared in a 3 liter stainless-steel reactor equipped with a heating jacket, a temperature probe and a stirrer, by mixing an aluminate solution containing 119 g of sodium hydroxide (NaOH), 128 g of alumina trihydrate ($Al_2O_3.3H_2O$, containing 65.2% by weight of $Al_2O_3$) and 195.5 g of water at 25° C. over 25 minutes, with a stirring speed of 300 rpm, with a silicate solution containing 565.3 g of sodium silicate, 55.3 g of NaOH and 1997.5 g of water at 25° C.

The stoichiometry of the growth gel is as follows: 3.48 $Na_2O/Al_2O_3$/3.07 $SiO_2$/180 $H_2O$. Homogenization of the growth gel is performed with stirring at 300 rpm for 25 minutes at 25° C.

b) Introduction of the Control Agent into the Reaction Medium 4.4 g of a solution of SIP are introduced into the reaction medium with a stirring speed of 300 rpm ($SIP/Al_2O_3$ mole ratio=0.02). A maturation step is then performed at 25° C. for 1 hour at 300 rpm before starting the crystallization.

c) Crystallization

The stirring speed is lowered to 50 rpm, and the reactor jacket is set to a nominal value of 80° C. so that the reaction medium rises in temperature to 75° C. over 80 minutes. After 22 hours at a stage of 75° C., the reaction medium is cooled by circulating cold water through the jacket to stop the crystallization.

d) Filtration/Washing

The solids are recovered on a sinter and then washed with deionized water to neutral pH.

e) Drying/Calcination

In order to characterize the product, drying is performed in an oven at 90° C. for 8 hours, and the loss on ignition of the dried product is 23% by weight.

A zeolite X with an Si/Al atomic ratio equal to 1.24 is obtained, in the form of slightly aggregated large crystals.

Example 3: (Invention)

Synthesis of Zeolite X with Addition of Nucleating Gel and Growth Gel, and Control Agent $SIP/Al_2O_3$=0.04 a) Preparation of the Growth Gel in a Reactor Stirred with an Archimedean Screw

A growth gel is prepared in a 3 liter stainless-steel reactor equipped with a heating jacket, a temperature probe and a stirrer, by mixing an aluminate solution containing 119 g of sodium hydroxide (NaOH), 128 g of alumina trihydrate ($Al_2O_3.3H_2O$, containing 65.2% by weight of $Al_2O_3$) and 195.5 g of water at 25° C. over 25 minutes, with a stirring speed of 300 rpm, with a silicate solution containing 565.3 g of sodium silicate, 55.3 g of NaOH and 1997.5 g of water at 25° C.

The stoichiometry of the growth gel is as follows: 3.48 $Na_2O/Al_2O_3$/3.07 $SiO_2$/180 $H_2O$. Homogenization of the growth gel is performed with stirring at 300 rpm for 25 minutes at 25° C.

b) Addition of the Nucleating Gel 61.2 g of nucleating gel (i.e. 2% by weight) of composition 12 $Na_2O/Al_2O_3$/10 $SiO_2$/180 $H_2O$ prepared in the same manner as the growth gel, and which has matured for 1 hour at 40° C., is added to the growth gel, at 25° C. with stirring at 300 rpm. After 5 minutes of homogenization at 300 rpm, the stirring speed is reduced to 100 rpm and stirring is continued for 30 minutes.

c) Introduction of the Control Agent into the Reaction Medium 8.8 g of a solution of SIP are introduced into the reaction medium with a stirring speed of 300 rpm ($SIP/Al_2O_3$ mole ratio=0.04). A maturation step is then performed at 25° C. for 1 hour at 300 rpm before starting the crystallization.

d) Crystallization

The stirring speed is lowered to 50 rpm, and the reactor jacket is set to a nominal value of 80° C. so that the reaction medium rises in temperature to 75° C. over 80 minutes. After 22 hours at a stage of 75° C., the reaction medium is cooled by circulating cold water through the jacket to stop the crystallization.

e) Filtration/Washing

The solids are recovered on a sinter and then washed with deionized water to neutral pH.

f) Drying/Calcination

In order to characterize the product, drying is performed in an oven at 90° C. for 8 hours, and the loss on ignition of the dried product is 23% by weight.

Zeolite X nanocrystal aggregates are obtained, the Si/Al atomic ratio of which aggregates is equal to 1.24.

Example 3 Bis: (Invention)

Synthesis of Zeolite X with Addition of Nucleating Gel and Growth Gel, and Control Agent: Sip/Al$_2$O$_3$ Ratio=0.12

The same procedure as in Example 3 is performed, but adding 26.4 g of SIP instead of 8.8 g so as to obtain an SIP/Al$_2$O$_3$ mole ratio equal to 0.12.

Zeolite X nanocrystal aggregates are obtained, the Si/Al atomic ratio of which aggregates is equal to 1.24.

Figure 1:
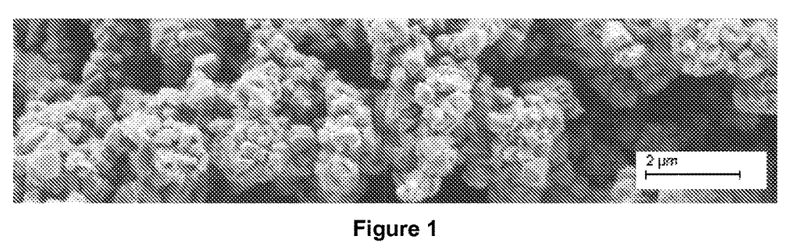
FIG. 1 is an SEM image of the solid obtained in Example 4.
Figure 2:
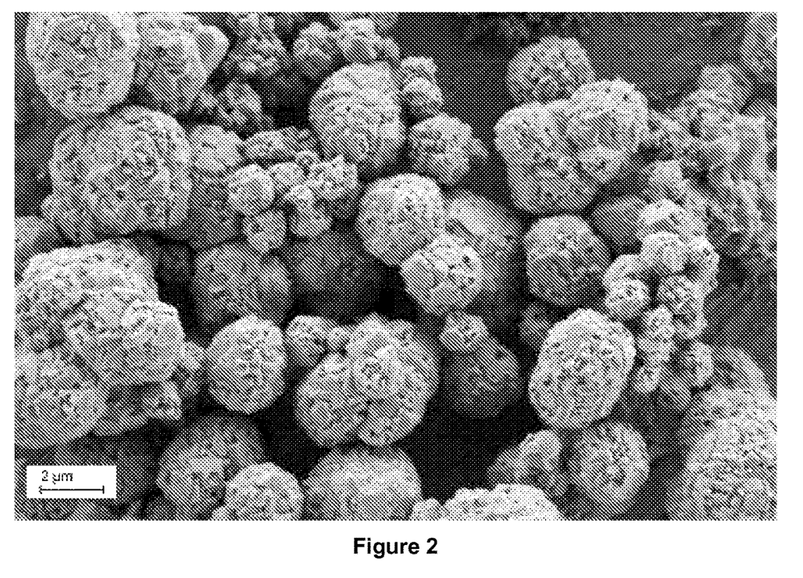
FIG. 2 is an SEM image of the solid obtained in Example 6.
Figure 3:
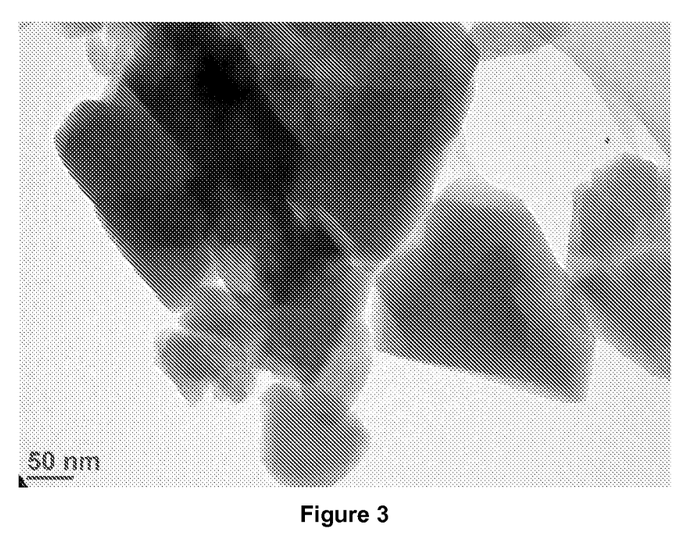
FIG. 3 is a TEM image of the solid obtained in Example 3 bis.

FIG. 3 shows a TEM image of the zeolite according to the invention obtained in Example 3 bis: filled crystals with no intra-crystalline mesopores are observed.

Example 4: (According to the Invention, FIG. 1)

Synthesis of Zeolite X with Addition of Nucleating Gel and Growth Gel, and Control Agent: TPOAC/Al$_2$O$_3$ Ratio=0.01 a) Preparation of the Growth Gel in a Reactor Stirred with an Archimedean Screw

A growth gel is prepared in a 50 liter stainless-steel reactor equipped with a heating jacket, a temperature probe and a stirrer, by mixing an aluminate solution containing 1810 g of sodium hydroxide (NaOH), 1930 g of alumina trihydrate (Al$_2$O$_3$.3H$_2$O, containing 65.2% by weight of Al$_2$O$_3$) and 3000 g of water at 25° C. over 25 minutes, with a stirring speed of 140 rpm, with a silicate solution containing 8470 g of sodium silicate, 835 g of NaOH and 30100 g of water at 25° C.

The stoichiometry of the growth gel is as follows: 3.48 Na$_2$O/Al$_2$O$_3$/3.07 SiO$_2$/180 H$_2$O. Homogenization of the growth gel is performed with stirring at 140 rpm for 25 minutes at 25° C.

b) Addition of the Nucleating Gel 923 g of nucleating gel (i.e. 2% by weight) of composition 12 Na$_2$O/Al$_2$O$_3$/10 SiO$_2$/180 H$_2$O prepared in the same manner as the growth gel, and which has matured for 1 hour at 40° C., is added to the growth gel, at 25° C. with stirring at 140 rpm. After 5 minutes of homogenization at 140 rpm, the stirring speed is reduced to 50 rpm and stirring is continued for 30 minutes.

c) Introduction of the Control Agent into the Reaction Medium 102 g of a solution of TPOAC at 60% in methanol (MeOH) are introduced into the reaction medium with a stirring speed of 140 rpm (TPOAC/Al$_2$O$_3$ mole ratio=0.01). A maturation step is then performed at 25° C. for 1 hour at 140 rpm before starting the crystallization.

d) Crystallization

The stirring speed is lowered to 35 rpm, and the reactor jacket is set to a nominal value of 80° C. so that the reaction medium rises in temperature to 75° C. over 80 minutes. After 22 hours at a stage of 75° C., the reaction medium is cooled by circulating cold water through the jacket to stop the crystallization.

e) Filtration/Washing

The solids are recovered on a sinter and then washed with deionized water to neutral pH.

f) Drying/Calcination

In order to characterize the product, drying is performed in an oven at 90° C. for 8 hours, and the loss on ignition of the dried product is 23% by weight.

Zeolite X nanocrystal aggregates are obtained, the Si/Al atomic ratio of which aggregates is equal to 1.24.

Example 5: (Comparative)

Synthesis of Zeolite X with Addition of Nucleating Gel and Growth Gel, with Control Agent: TPOAC/Al$_2$O$_3$ Ratio=0.02

The same procedure as in Example 4 is performed, but adding 204 g of TPOAC at 60% in methanol instead of 102 g so as to obtain a TPOAC/Al$_2$O$_3$ mole ratio equal to 0.02.

Large-sized zeolite X crystal aggregates are obtained, the Si/Al atomic ratio of which is equal to 1.24.

Figure 4:
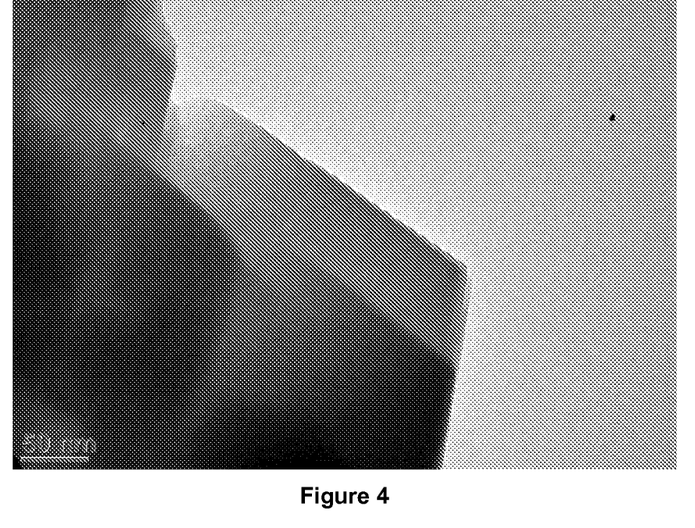
FIG. 4 is a TEM image of the solid obtained in Example 5.

FIG. 4 shows a TEM image of the zeolite thus obtained: the presence of mesoporous cavities inside the crystals is observed.

Example 6: (Invention, FIG. 2)

Synthesis of Zeolite X with Addition of Micro-Crystals and Growth Gel, and with Control Agent: TPOAC/Al$_2$O$_3$ Ratio=0.014

The same procedure as in Example 4 is performed, in which, in step b), the nucleating gel is replaced with the introduction of 1% by weight of micro-crystals (relative to the total weight of the growth gel), i.e. 462 g anhydrous equivalent of zeolite X crystals (seed crystals with a volume-mean diameter of about 0.8 µm, prepared as described in synthesis Example b) of patent application WO 2014/0907771), and in which, in step c), the amount of control agent introduced into the reaction medium is 142.8 g.

Zeolite X nanocrystal aggregates are obtained, the Si/Al atomic ratio of which aggregates is equal to 1.24.

The data relating to the solids obtained in Examples 1 to 6 above are collated in Table 1 below.

TABLE 1

| | | | Operating conditions of the syntheses | | Characteristics of the FAU zeolite nanocrystal aggregates | | | | |
|---|---|---|---|---|---|---|---|---|---|
| Control agent | Example | Type of seeding | Mole ratio control agent/$Al_2O_3$ in gel | External surface area ($m^2 \cdot g^{-1}$) | Mean nano-crystal size (nm) | Mean aggregate size (μm) | $V_{DB}$ ($cm^3 \cdot g^{-1}$) | Diffract. |
| Without | Example 1 (comparative) | 2% nucleating gel | 0 | — | — | >10 | 0.335 | X pure |
| SIP | Example 2 (comparative) | No | 0.02 | 25 | 900 | few aggregates | 0.326 | X pure |
| | Example 3 (invention) | 2% nucleating gel | 0.04 | 53 | 400 | 1 | 0.343 | X pure |
| | Example 3 bis (invention) | 2% nucleating gel | 0.12 | 52 | 400 | 1.5 | 0.344 | X pure |
| TPOAC | Example 4 (invention) | 2% nucleating gel | 0.01 | 65 | 300 | 2 | 0.351 | X pure |
| | Example 5 (comparative) | 2% nucleating gel | 0.02 | 85 | 650 | 2.5 | 0.339 | X pure |
| | Example 6 (invention) | 1% micro-crystals | 0.014 | 68 | 200 | 3.5 | 0.347 | X pure |

SIP = N-phenylaminopropyltrimethoxysilane
TPOAC = [3-(trimethoxysilyl)propyl]octadecyldimethylammonium chloride
$V_{DB}$ ($cm^3 \cdot g^{-1}$) = Dubinin-Raduskevitch Volume expressed in $cm^3 \cdot g^{-1}$,
Diffract. = Qualitative and quantitative analysis by x-ray diffraction permitting identification of the crystalline phases present in the solid analyzed
X pure = zeolite FAU X with less than 2% of polluting phase.

The invention claimed is:

1. A zeolite material in the form of FAU zeolite nanocrystal aggregates having at least the following characteristics:
    a Si/Al atomic ratio of between 1 and 1.4, limits inclusive,
    an external surface area of between 20 $m^2 \cdot g^{-1}$ and 80 $m^2 \cdot g^{-1}$,
    a number-mean diameter of the nanocrystals of between 50 nm and 500 nm, limits inclusive, and
    a number-mean aggregate size of between 0.2 μm and 10 μm.

2. The zeolite material as claimed in claim 1, wherein the zeolite nanocrystals are nanocrystals of zeolite(s) of FAU type selected from the group consisting zeolites X, MSX and LSX.

3. The zeolite material as claimed in claim 1, wherein the exchangeable sites of the zeolites are occupied by ions selected from the group consisting of hydronium, lithium, sodium, potassium, calcium, and barium ions.

4. A zeolite agglomerate comprising at least one zeolite material in the form of FAU zeolite nanocrystal aggregates as claimed in claim 1 and at least one binder, the binder content being less than or equal to 30%.

5. The zeolite agglomerate as claimed in claim 4, wherein the binder content is less than or equal to 20%.

6. A method, comprising using a material comprising at least one zeolite material in the form of FAU zeolite nanocrystal aggregates as claimed in claim 1, as an adsorbent.

7. The zeolite material as claimed in claim 1, having at least the following characteristics:
    a Si/Al atomic ratio of between 1 and 1.4, limits inclusive,
    an external surface area of between 30 $m^2 \cdot g^{-1}$ and 80 $m^2 \cdot g^{-1}$,
    a number-mean diameter of the nanocrystals of between 50 nm and 400 nm, limits inclusive, and
    a number-mean aggregate size of between 0.3 μm and 10 μm.

8. A zeolite material as claimed in claim 1, having at least the following characteristics:
    a Si/Al atomic ratio of between 1 and 1.4, limits inclusive,
    an external surface area of between 40 $m^2 \cdot g^{-1}$ and 60 $m^2 \cdot g^{-1}$,
    a number-mean diameter of the nanocrystals of between 100 nm and 300 nm, limits inclusive, and
    a number-mean aggregate size of between 0.5 μm and 8 μm.

9. The zeolite material as claimed in claim 1, wherein the zeolite nanocrystals are nanocrystals of zeolite(s) of FAU X type.

10. A method, comprising using a material comprising at least one zeolite material in the form of FAU zeolite nanocrystal aggregates as claimed in claim 1, as an adsorbent, wherein the method is selected from the group consisting of processes for separating gaseous or liquid streams, gas-phase pressure-modulated adsorption processes, gas-phase or liquid-phase temperature-modulated adsorption processes, adsorption processes in a fixed bed without regeneration, and separation processes in simulated moving beds.

11. A process for preparing the zeolite material as claimed in claim 1, comprising:
    increasing the temperature of a growth gel to obtain the zeolite material, wherein
    the growth gel comprises a source of silica, a source of alumina, a nucleating agent, and at least one control agent selected from the group consisting of N-phenylaminopropyltrimethoxysilane (SIP) and [3-(trimethoxysilyl)-propyl]octadecyl-dimethylammonium chloride (TPOAC),
    the growth gel has a temperature of from 0° C. to 60° C. prior to increasing the temperature,
    the molar ratio of N-phenylaminopropyltrimethoxysilane (SIP) to alumina in the growth gel is 0.001 to 0.12, when the growth gel contains N-phenylaminopropyltrimethoxysilane (SIP), and
    the molar ratio of [3-(trimethoxysilyl)propyl]octadecyldimethylammonium chloride (TPOAC) to alumina in the control gel is 0.001 to 0.01, when the control gel contains [3-(trimethoxysilyl)propyl]octadecyldimethylammonium chloride (TPOAC).

12. The process as claimed in claim 11, comprising at least the following steps:
  (a) preparing the growth gel, by mixing a source of silica with a source of alumina, at a temperature of between 0° C. and 60° C.,
  (b) adding to the growth gel from step (a) a nucleating agent, at a temperature between 0° C. and 60° C.,
  (c) adding to the reaction medium at least one control agent,
  (d) carrying out a crystallization reaction by increasing the temperature to obtain zeolite crystals,
  (e) filtering and washing the zeolite crystals obtained, and
  (f) drying and calcination.

13. The process as claimed in claim 11, wherein the growth gel comprises a homogeneous mixture of a source of silica, a source of alumina, a strong mineral base, and water.

14. The process as claimed in claim 11, wherein the nucleating agent is selected from the group consisting of a nucleating gel, a crystal, a mineral particle, a clay, and also mixtures thereof.

15. The process as claimed in claim 11, wherein the nucleating agent is selected from the group consisting of gels, crystals and mineral particles.

16. The process as claimed in claim 11, wherein the control agent contains N-phenylaminopropyltrimethoxysilane (SIP).

17. The process as claimed in claim 11, wherein the control agent contains [3-(trimethoxysilyl)-propyl]octadecyl-dimethylammonium chloride (TPOAC).

* * * * *